Patented Apr. 4, 1939

2,153,161

UNITED STATES PATENT OFFICE 2,153,161

RUBBING WAX COMPOSITION

Abraham Shapiro, Chicago, Ill.

No Drawing. Application July 11, 1936,
Serial No. 90,186

3 Claims. (Cl. 134—15)

This invention relates to improvements in rubbing wax compositions.

One of the objects of my invention is to provide a composition which possesses both cleansing and polishing properties and which permits the accomplishment of both results in a single operation.

Another object is to provide a composition which when applied, cleanses a finished surface and coats it with a film of hard wax which can be rubbed to a high luster.

Another object is to provide a composition which conditions a finished surface so that it is subsequently unaffected by rain marks, finger prints or the like.

Another object is to provide a cleaning and polishing composition which is cheap to manufacture and which requires a minimum of time and effort to apply.

Another object is to provide a method for producing a composition of the foregoing characteristics.

Other objects and advantages will appear as this description progresses.

In the present day manufacture of polishing compositions to be used for automobiles, furniture and the like, it is the general practice in making a composition of this nature, to blend with a hard wax certain softer waxes to produce a composition which can be applied comparatively with less effort, and additionally prevent it from becoming gummy or tacky. This process of blending hard and soft waxes, consequently results in a composition which when applied will produce a soft wax film that does not withstand usage and weather conditions to the same extent as hard wax when used alone.

It is therefore the purpose of my invention to produce a composition of such character which permits its use and application with a minimum of time and effort and which will at the same time coat the surface with a protective film of hard wax that assumes a high luster.

In my invention I eliminate completely the use of soft waxes and facilitate the spreading of the hard wax (such as carnauba wax) by using an oil as a solvent to dissolve it.

The oil that I have found most suitable is a product of the oil refineries and has the following specifications. Flash point (tag open cup), 140 degrees F.; initial boiling point, 360 degrees F., min.; end point, 500 degrees, max.

The wax will enter into solution with the oil at a temperature slightly above the melting point of the former, and in the course of manufacture as will be explained later, the oil-wax solution forms an emulsion with the water content of the composition.

During the application of the composition the emulsion is broken, the wax leaving the solution and adhering to the surface and forming a hard film which assumes a high polish. The solvent oil either evaporates or is absorbed by the cloth used to apply it. The breaking up of the emulsion presents conditions unfavorable for re-emulsification of the wax and foreign substances, and consequently neither rain nor finger prints will affect the luster of the surface.

The use of the oil is desirable for the reasons, that it is a hydrocarbon solvent and therefore has no solvent action on lacquer or paint films. Its rate of evaporation is such that proper setting of the wax is effected and its body is sufficiently thin so as not to leave an oil film.

I also incorporate in my cleaning and polishing composition, a very mild oil absorbing abrasive and polish-agent, such as a decomposed limestone, known in the trade as Tripoli (air flow). This serves as the cleaning agent and is very well suited for this purpose because its abrasive action tends to spend itself after a few strokes of application and the wax begins to deposit itself on the finished surface; upon further rubbing the wax hardens and assumes a high polish. Continued exposure permits the complete evaporation of the oil and moisture content and tends to harden the wax film which becomes even brighter upon subsequent polishings.

I form my composition by mixing together 143 parts of carnauba wax (parts wherein referred to refers to parts by weight) and 300 parts of the oil just described. Both the wax and oil are heated to a temperature of 190 degrees F. which is slightly above the melting point of the wax and in which condition it becomes soluble. 175 parts of Tripoli (air flow) is then added and constantly agitated in the oil-wax solution to acquire uniform distribution of the abrasive. When it is desired to produce only a waxing composition the abrasive is omitted from the process. 55 parts of oleic acid and 300 parts of the solvent oil amounting to a total of 600 parts of the oil are added. During the entire process the mixture is kept at a constant temperature of 190 degrees F. and constantly agitated. 25 parts of triethanolamine is separately dissolved in 2300 parts of water which is kept at a temperature equivalent to that of the mass. The triethanolamine and the oleic acid plus the fatty acids in the wax act as emulsifying agents to stabilize the emulsion of oily water. This latter solution is then intermixed with the general mass and continuously agitated during which time the balance of the water is slowly added in small quantities until the total water content has reached 8300 parts.

The composition is continuously agitated until the temperature has dropped to 65 degrees F. At this point it is ready for packing.

I claim:

1. A rubbing wax composition consisting of an aqueous emulsion of a dispersion of carnauba wax in a hydrocarbon distillate having a boiling range of 360° F.–500° F. and a flash point of about 140° F.

2. A rubbing wax composition consisting of an aqueous emulsion of a dispersion of carnauba wax in a hydrocarbon distillate having a boiling range of 360° F.–500° F. and a flash point of about 140° F. and a water-soluble emulsifier.

3. A rubbing wax composition consisting of an aqueous emulsion of a dispersion of a hard wax in a hydrocarbon distillate having a boiling range of 360° F.–500° F. and a flash point of about 140° F. and a water-soluble emulsifier.

ABRAHAM SHAPIRO.